United States Patent [19]

Schulz

[11] 4,254,669
[45] Mar. 10, 1981

[54] TUBE-SHAFT PLANETARY-GEAR TRANSMISSION

[75] Inventor: Horst Schulz, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 53,279

[22] Filed: Jun. 29, 1979

[30] Foreign Application Priority Data

Jul. 5, 1978 [DE] Fed. Rep. of Germany ....... 2829502

[51] Int. Cl.³ .................... F16H 37/06; F16H 1/28; E21B 4/00
[52] U.S. Cl. .......................... 74/705; 74/674; 74/801; 175/106
[58] Field of Search ............. 74/705, 682, 674, 665 P, 74/789, 792, 797, 801, 750 R; 175/106; 415/122 A, 122 R, 502; 417/405

[56] References Cited

U.S. PATENT DOCUMENTS

| 1,523,629 | 1/1925 | Bullock | 175/106 X |
| 1,786,158 | 12/1930 | Hawes | 74/705 |
| 1,790,460 | 1/1931 | Capeliuschnicoff | 175/106 |
| 2,488,660 | 11/1949 | Conkle | 74/705 |
| 2,654,572 | 10/1953 | Arutunoff | 175/106 X |
| 2,937,008 | 5/1960 | Whittle | 175/106 X |
| 3,015,973 | 1/1962 | Doerries | 74/705 |
| 3,143,006 | 8/1964 | Kratochvil | 74/705 X |
| 3,598,188 | 8/1971 | Foster | 74/801 X |
| 3,669,199 | 6/1972 | Cullen et al. | 175/106 |
| 4,108,023 | 8/1978 | Garrison | 175/106 X |

FOREIGN PATENT DOCUMENTS

| 2900189 | 1/1978 | Fed. Rep. of Germany | 175/106 |
| 545008 | 7/1956 | Italy | 74/705 |
| 629687 | 5/1959 | U.S.S.R. | 175/106 |

OTHER PUBLICATIONS

"Rotation-Speed Reducing Device for Turbodrills Slow Turbine," French Institute of Petroleum, 12/75.

Primary Examiner—C. J. Husar
Assistant Examiner—Philip W. Thor
Attorney, Agent, or Firm—Karl F. Ross

[57] ABSTRACT

A shaft transmission has coaxial tubular input and output shafts extending forwardly and backwardly from the transmission. Front and rear planet assemblies in the transmission include respective sun gears, planet carriers, and ring gears. The front planet carrier is fixed on an outer shaft enclosing the entire transmission. The rear sun gear is fixed rotationally to the input shaft. The rear planet carrier is fixed rotationally both to the front sun gear and to the output shaft. The rear ring gear is fixed rotationally to the front ring gear. Such a transmission divides the load between the front and rear planet assemblies while giving a substantial stepdown in the neighborhood of 4:1. In addition the input and output shafts form a throughgoing passage through which a fluid medium, such as drilling mud, can be passed.

7 Claims, 2 Drawing Figures

TUBE-SHAFT PLANETARY-GEAR TRANSMISSION

FIELD OF THE INVENTION

The present invention relates to a tube-shaft transmission. More particularly this invention concerns such a transmission employing planetary gearing and usable at the bottom end of a drilling string.

BACKGROUND OF THE INVENTION

The drill bit at the lower end of a drilling string is normally rotated by multistage turbines driven by liquid, normally drilling mud, that is pumped at high pressure and in large volumes down through the string. As the output speed of such turbines is rather large, it is necessary to provide a stepdown transmission between the turbine output and the drill bit. Furthermore it is necessary to provide a passage so that the drilling mud, after traversing and driving the turbines, can exit from the lower end of the drill string at the bit and thence pass upwardly around the drill string, carrying with it the chips and particles created by the drill bit.

The amount of space is greatly limited, because on the one hand the maximum outer diameter of the drill string will be slightly smaller than the inside diameter of the bore so that the drilling mud can move upwardly around the string along the invariably nonrotating outer tube of the string, and on the other hand because the central axial passage through which the drilling mud passes downwardly in the string must be as large as possible so that large volumes of mud at high pressure can be supplied to the bottom end of the drill string, both to power the drive turbines and ensure good drilling.

Transmissions are known using planetary gearing that is capable of fitting within the relatively small available space. As a result of the small amount of space, however, the ratio of teeth between the gears lies between 2.2:1 and 1.7:1 so that the maximum transmission stepdown ratio lies somewhere between 1:1 and 3.2:1. Since the service life of the drilling head is dependent in large part on the rotation speed, rotating it at high speed wears it out rapidly. Furthermore the passage through the center of such a drill string is relatively limited in cross-sectional size so that often an inadequate amount of liquid for cooling and clearing of the bit is passed through the drill string. The planetary gearing often wears out relatively rapidly due to the extremely large forces that are applied to the various bearings. The gears themselves often wear out prematurely as a result of transmitting extremely great loads. In fact in these known transmissions the gear load is largely proportional to the load and to the spacing of the planet axes from the main axis of the gearing as well as the number of planet gears. Obviously in a limited space these factors are also greatly limited.

OBJECTS OF THE INVENTION

It is therefore an object of the present invention to provide an improved shaft transmission.

Another object is to provide such a transmission which provides a relatively large stepdown ratio, yet which has a long service life.

Another object is to provide such a transmission which is extremely compact so that a relatively large central passage can be left through the tube shaft incorporating the transmission.

Another object is to provide such a transmission which is so constructed that the loads and stresses to which its various parts are subjected is spread out as greatly as possible so as to minimize wear.

SUMMARY OF THE INVENTION

These objects are attained according to the instant invention in a shaft transmission having coaxial input and output shafts and front and rear planetary assemblies each comprising a sun gear, a planet carrier having at least one planet gear meshing with the respective sun gear, and a ring gear meshing with the respective planet gear or gears. According to this invention the front planet carrier, that is the planet assembly on the input-shaft side, is substantially arrested from rotating by it being fixed within an outer nonrotating shaft. The rear sun gear, that is the sun gear of the planetary assembly to the side of the output shaft, it rotationally fixed to the input shaft. The rear planet carrier is fixed rotationally to both the front sun gear and to the output shaft. Finally the rear ring gear is fixed rotationally to the front ring gear.

According to the present invention using a tooth ratio between the sun and ring gears of between 1.7:1 and 2.2:1 it is possible to produce an overall stepdown lying between 3.6:1 and 4.5:1. This relatively large stepdown allows a drill bit constituting the load of the transmission according to this invention to be rotated at relatively low speed for maximum effectiveness and longest service life.

Furthermore according to this invention the load is split between the two planetary-gear assemblies, with only approximately 75% of the load being transmitted by the rear assembly and the balance being transmitted by the front assembly. Consequently the load on the gears and their bearings is considerably reduced so that a greatly longer service life is obtained. What is more it is possible to tortionally load the output shaft much more through the transmission according to this invention so that relatively deep holes can be drilled with ease.

The rotation direction of the output shaft will be the same as that of the input shaft, merely much slower. Thus the standard turbines can be used as well as the standard threaded drill bit. Furthermore since the front planet carrier is rotationally fixed on the outer tube, stresses within the transmission are limited, and can easily be monitored at the top of the shaft. In fact the planet carrier can be formed by the lower end of the outer tube shaft so that the assembly is extremely compact and easily put together and taken apart.

It is possible to provide a heavy-duty thrust bearing between the front and rear planet carriers, that is approximately in the middle of the transmission according to this invention. This heavy-duty bearing can easily take up all the considerable axial stresses in a standard drill string with minimum cost.

SPECIFIC DESCRIPTION

Figure 1:
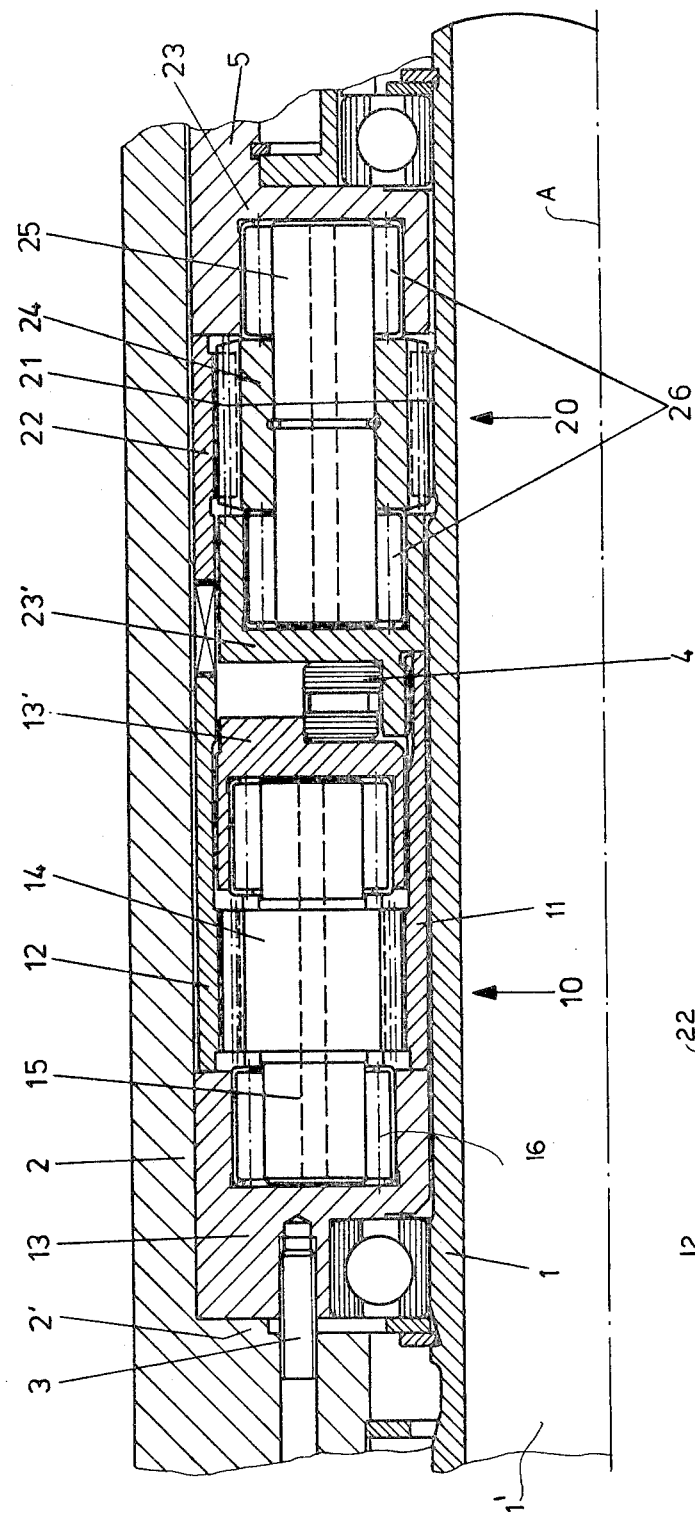
FIG. 1 is an axial section through a shaft transmission according to the instant invention.

The transmission according to the instant invention is adapted to be mounted in a drill string having an outer tube or casing 2 and an inner tube shaft 1. The input shaft 1 is connected to a drive 6. In addition the transmission has an output shaft 5 connected to a load 7. In the embodiment shown the drive is a turbine provided at the lower end of a drill string and powered by the drilling mud that is pumped down through this string, and the load 7 is a roller-type boring bit.

According to this invention two planetary-gear assemblies 10 and 20 are provided. The assemblies 10 and 20 have respective sun gears 11 and 21, ring gears 12 and 22, and planet carriers 13 and 23 respectively carrying planet gears 14 and 24. These planet gears 14 and 24 in turn have stub shafts 15 and 25 received in roller bearings 16 and 26 in the respective planet carriers 13 and 23.

According to the instant invention the sun gear 21 of the rear planetary assembly 20 is formed directly on the input shaft 1 which itself is centered on an axis A of the assembly. The fixed casing or outer shaft 2 has a shoulder 2' to which the front planet carrier 13 is secured by screws 3. The other planet carrier 23 is formed directly in the upper end of the output shaft 5. The two ring gears 12 and 22 rotate jointly about the axis A. In addition the planet carriers 13 and 23 have respective inner parts 13' and 23' which are axially braced against each other by means of an axial-thrust bearing 4.

Figure 2:
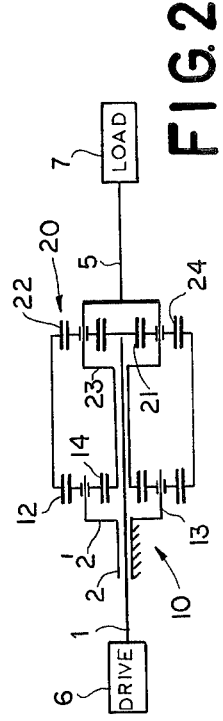
FIG. 2 is a schematic diagram illustrating the transmission according to this invention.

The transmission shown in FIGS. 1 and 2 is not a simple two-stage stepdown transmission, but in fact is a load-splitting transmission. To this end the sun gears 11 and 21 respectively have forty-eight and forty teeth, whereas both of the outer ring gears 12 and 24 have eighty-four teeth. The transmision is driven by rotation of the input tube shaft 1 so that force is transmitted from the input shaft 1 via its sun gear 21 to the planet gear 24 and thereby to the planet carrier 23 which is fixed on the output shaft 5. The sun gear 11 rotates at the same speed as the output shaft 5 and thereby rotates the front ring gear 12 in an opposite direction because the planet carrier 13 is fixed. As a result of these two opposite rotations the load is in fact split between the two assemblies 10 and 20. Thus the bearings 16 and 26 each only carry a part of the load transmitted through the transmission so that their service lives will be correspondingly increased.

The transmission shown, having forty teeth on the rear sun gear 21, forty-eight on the front sun gear 11, and eighty-four teeth on each of the ring gears 12 and 24 will thereby produce a stepdown of 4.30:1. Simultaneously the load will be divided 72% for the rear planetary assembly 20 and 28% for the front planetary assembly 10. The output shaft 5 will turn in the same direction as the input shaft 1, but substantially slower. Thus it is possible to use a standard threaded drill bit on the output shaft 5.

The inner tube shaft 1 forms a passage 1' extending axially through the entire transmission so that the drilling mud which powers the multistage turbines consituting the drive 6 can pass freely through this transmission. The output shaft 5 is similarly tubular.

Although the transmission described above is particularly intended for use in a deep-well drill string, it is of course within the scope of this invention to use it in other applications wherein a relatively large stepdown is needed, but wherein the transmission for this stepdown must fit in a relatively limited annular space in a shaft.

I claim:

1. A shaft transmission comprising:
   an input shaft defining a transmission axis;
   an output shaft coaxial with said input shaft;
   a front planetary assembly centered assembly centered on said axis and including
      a front sun gear rotatable about said axis,
      a front planet carrier provided with at least one front planet gear meshing with said front sun gear, and
      a front ring gear meshing with said front planet gear;
   means for substantially arresting said front planet carrier from rotating about said axis; and
   a rear planetary assembly centered on said axis and including
      a rear sun gear fixed rotationally to said input shaft,
      a rear planet carrier fixed rotationally to said front sun gear and to said output shaft and provided with at least one rear planet gear meshing with said rear sun gear, and
      a rear ring gear fixed rotationally to said front ring gear and meshing with said rear planet gear.

2. The transmission defined in claim 1 wherein said means is an outer shaft centered on said axis, containing said assemblies, and coaxially receiving at least portions of both of said shafts.

3. The transmission defined in claim 2 wherein said input shaft is tubular and is formed with said rear sun gear.

4. The transmission defined in claim 2 wherein said shafts are tubular and together form an axially throughgoing passage.

5. The transmission defined in claim 2 wherein said ring gears have the same number of teeth.

6. The transmission defined in claim 5, further comprising a pressure bearing engaged axially between said planet carriers.

7. The transmission defined in claim 5 wherein said sun gears have the same number of teeth.

* * * * *